(12) United States Patent
Asada et al.

(10) Patent No.: US 7,702,448 B2
(45) Date of Patent: Apr. 20, 2010

(54) DRIVING AMOUNT CONTROLLER

(75) Inventors: Yukihiro Asada, Saitama (JP); Makoto Tsuyuguchi, Saitama (JP); Toru Takeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/057,227

(22) Filed: Mar. 27, 2008

(65) Prior Publication Data

US 2008/0243357 A1    Oct. 2, 2008

(30) Foreign Application Priority Data

Mar. 30, 2007  (JP)  ............................. 2007-095466

(51) Int. Cl.
*B60T 7/12* (2006.01)

(52) U.S. Cl. .................. 701/103; 701/110; 123/399

(58) Field of Classification Search .............. 123/349, 123/350, 352, 353, 361, 376, 399; 701/103, 701/110
See application file for complete search history.

(56) References Cited

U.S. PATENT DOCUMENTS

| 5,056,613 | A | * | 10/1991 | Porter et al. ............... 180/178 |
| 5,189,621 | A |   | 2/1993  | Onari et al. |
| 5,333,584 | A | * | 8/1994  | Kamio et al. ............... 123/399 |
| 5,420,793 | A | * | 5/1995  | Oo et al. ..................... 701/93 |
| 5,447,134 | A | * | 9/1995  | Yokoyama ................. 123/399 |
| 6,718,255 | B1|   | 4/2004  | Okubo |
| 6,848,420 | B2| * | 2/2005  | Ishiguro et al. ............ 123/399 |
| 2003/0187564 | A1 | * | 10/2003 | Yasui et al. ................. 701/102 |
| 2004/0035393 | A1 | * | 2/2004  | Ishiguro et al. ............ 123/399 |

FOREIGN PATENT DOCUMENTS

| DE | 103 35 732 A1 | 2/2005 |
| EP | 0 114 401 A2  | 8/1984 |
| EP | 0 561 382 A1  | 9/1993 |
| EP | 0 735 256 A2  | 10/1996 |
| EP | 1 203 874 A1  | 5/2002 |
| JP | 61-106934 A   | 5/1986 |
| JP | 9-317538 A    | 12/1997 |
| JP | 2003-216206 A | 7/2003 |
| JP | 2006-307797 A | 11/2006 |

* cited by examiner

*Primary Examiner*—Stephen K Cronin
*Assistant Examiner*—Anthony L Bacon
(74) *Attorney, Agent, or Firm*—Birch, Stewart, Kolasch & Birch, LLP

(57) ABSTRACT

A driving amount controller for reducing a response delay or erroneous deviation in control of a driving amount of a controlled system. The driving amount controller includes an ECU that increases an add-in amount to a duty ratio DUT of a control signal according to an increase in the speed variation $\Delta DTHR$ of a target opening DTRH of the throttle valve 16 when the speed variation $\Delta DTHR$ is positive. In addition, the ECU increases the add-in amount to the duty ratio DUT of the control signal according to a decrease in the speed variation $\Delta DTHR$ when the speed variation $\Delta DTHR$ is negative. A throttle valve on a vehicle is an example of the controlled system.

14 Claims, 14 Drawing Sheets

DRIVING AMOUNT CONTROLLER

CROSS-REFERENCE TO RELATED APPLICATION

The present application claims priority under 35 U.S.C. §119 to Japanese Patent Application No. 2007-095466, filed Mar. 30, 2007, the entire contents of which are hereby incorporated by reference.

BACKGROUND OF THE INVENTION

1. Field of the Invention

The present invention relates to a driving amount controller for controlling a driving amount of a target system (for example, the opening of a throttle valve) by way of the output of a motor.

2. Description of Background Art

The output of an engine in a motorcycle or a four-wheel vehicle is, in general, controlled by use of a throttle grip or an accelerator pedal. More specifically, the output of the engine is determined by regulation according to the turning amount of the throttle grip or the step-in amount of the accelerator pedal.

Ordinarily, a throttle valve is connected to a motor and a return spring, and the regulation of the opening is conducted by a method in which the throttle valve is energized in the valve opening direction by the motor and is energized in the valve closing direction by the motor and the return spring.

Since the opening of the throttle valve is regulated through the motor and the return spring as above-mentioned, a response delay or erroneous deviation may sometimes be generated in the control of the opening of the throttle valve (and in the actual engine output corresponding thereto) in response to the operation of the throttle grip or the accelerator pedal. There have been proposed a variety of devices for coping with such a response delay or erroneous deviation (refer to Japanese Patent Laid-open No. 2003-216206, Japanese Patent Laid-open No. Sho 61-106934, and Japanese Patent Laid-open No. 2006-307797.

However, each of the devices disclosed in Japanese Patent Laid-open No. 2003-216206, Japanese Patent Laid-open No. Sho 61-106934, and Japanese Patent Laid-open No. 2006-307797 has room for improvement as to the response performance and/or erroneous deviation in the control of the opening of a throttle valve. The above-mentioned patent documents take no account of the response performance in regulation of the opening of the throttle valve attendant on the hysteresis characteristics as above-mentioned, or of the erroneous deviation between an operation made by the driver and the opening of the throttle valve.

SUMMARY AND OBJECTS OF THE INVENTION

According to an embodiment of the present invention, a driving amount controller is provided for controlling a driving amount of a controlled system by way of an output of a motor. The driving amount controller includes a target driving amount input means for inputting a target driving amount for the controlled system; and a control means for transmitting to the motor a control signal for controlling the output of the motor with an output characteristic according to the target driving amount. The control means performs either one or both of a process of increasing the output of the motor by varying the output characteristic of the control signal according to an increase in the speed variation of the target driving amount when the speed variation is positive, and a process of decreasing the output of the motor by varying the output characteristic of the control signal according to a decrease in the speed variation when the speed variation is negative.

According to an embodiment of the present invention, when the speed variation of the target driving amount of the controlled system is positive, an increase in the motor output attendant on the increase in the speed variation is added to the increase in the motor output due to the increase in the target driving amount. This ensures that the motor output is more enlarged at the time of rapid acceleration, and the driving amount of the controlled system is more increased accordingly. Therefore, it is possible to enhance the response performance in control of the driving amount of the controlled system.

In addition, according to an embodiment of the present invention, when the speed variation of the target driving amount for the controlled system is negative, the decrease in the motor output is suppressed according to the decrease (increase in the minus direction) in the speed variation. As a result, the decrease in the motor output is slowed at the time of rapid deceleration, and the decrease in the driving amount of the controlled system is also slowed accordingly. Therefore, it is possible to prevent an erroneous deviation in control of the driving amount of the controlled system (an overshoot of the actual driving amount relative to the target driving amount for the controlled system).

As the controlled system, for example, a throttle valve can be used; as the driving amount, for example, the opening of the throttle valve can be used.

Furthermore, preferably, the control means determines the output characteristic of the control signal in each of the two processes by use of a positive quadratic function of the speed variation. In the graph of the quadratic function, the absolute value of the inclination of a tangent thereto increases as the point of contact comes away from the vertex. Therefore, when the speed variation of the target driving amount is near zero, i.e., when a moderate acceleration or deceleration operation is being conducted, the driving amount of the controlled system can be increased or decreased moderately, and the drivability of the vehicle is enhanced. In addition, it is possible to moderately increase the driving amount of the controlled system, and to prevent an excessive acceleration (an overshoot of the actual driving amount relative to the target driving amount for the controlled system).

Further, when the speed variation of the target driving amount is positive and located away from the vertex of the graph, i.e., when a rapid acceleration operation is being conducted, it is possible to rapidly increase the driving amount of the controlled system, and to realize a high response performance in relation to the driver's demand. Further, when the speed variation of the target driving amount is negative and located away from the vertex of the graph, i.e., when a rapid deceleration operation is being conducted, it is possible to decrease the driving amount of the controlled system comparatively moderately, and to prevent an excessive decrease of the driving amount (an overshoot of the actual driving amount relative to the target driving amount for the controlled system).

Effects of the invention include the following:

According to the embodiment of the present invention, when the speed variation of the target driving amount for the controlled system is positive, an increase in the motor output attendant on the increase in the speed variation is added to the increase in the motor output due to the increase in the target driving amount. As a result, the motor output at the time of rapid acceleration is enlarged, and the driving amount of the controlled system is also enlarged accordingly. Therefore, it is possible to enhance the response performance in control of the driving amount of the controlled system.

Further, according to the embodiment of the present invention, when the speed variation of the target driving amount for the controlled system is negative, the decrease in the motor output is restrained according to the decrease (increase in the minus direction) in the speed variation. As a result, the decrease in the motor output is slowed at the time of rapid deceleration, and the decrease in the driving amount of the controlled system is also slowed accordingly. Therefore, it is possible to prevent an erroneous deviation of the driving amount of the controlled system (an overshoot of the actual driving amount relative to the target driving amount for the controlled system).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
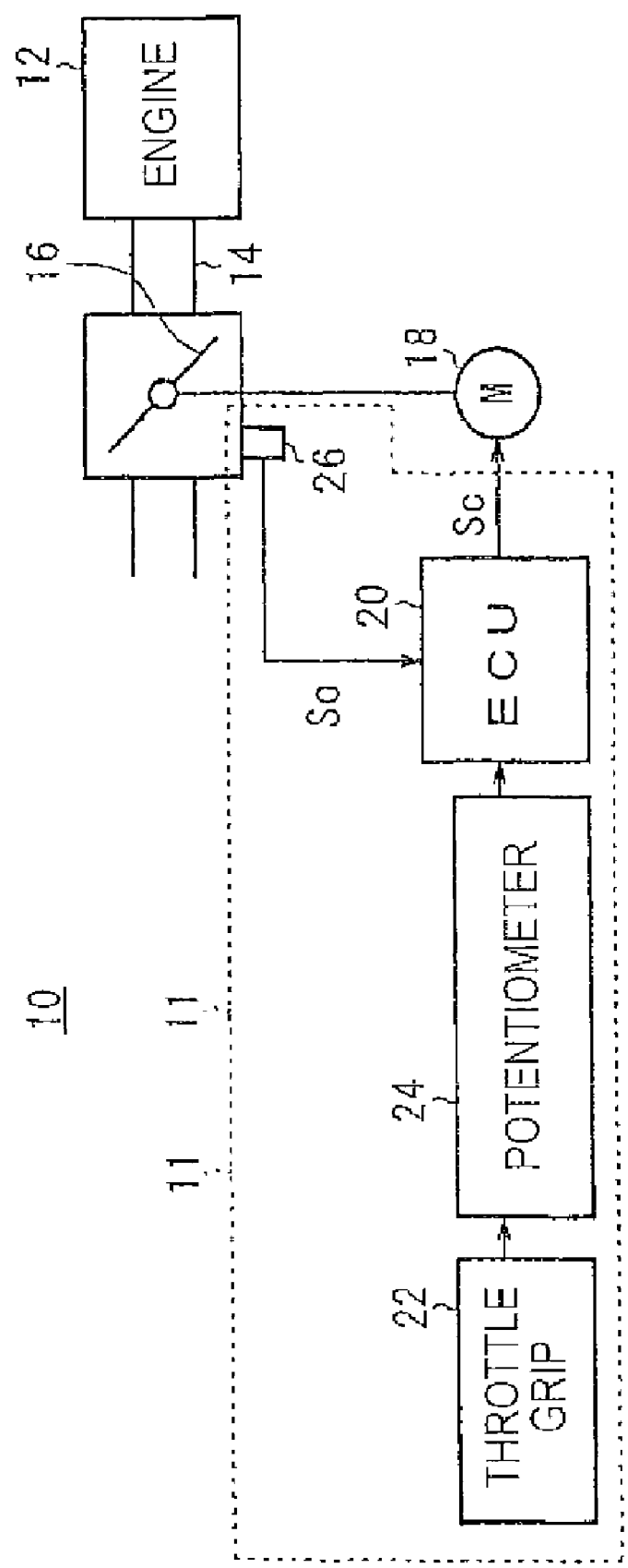
FIG. 1 is a block diagram showing the schematic configuration of a vehicle on which an engine output controller according to an embodiment of the present invention is mounted.

FIG. 1 shows a functional block diagram of a vehicle 10 on which an engine output controller 11 according to an embodiment of the present invention is mounted. In this embodiment, the vehicle 10 is a motorcycle, and the vehicle 10 has an engine 12. An intake passage 14 connected to the engine 12 is equipped therein with a throttle valve 16 for controlling the quantity of air supplied into the engine 12. The throttle valve 16 is attached to a return spring (not shown), which energized (biases) the throttle valve 16 in the direction for closing the throttle valve 16. In addition, a motor 18 is connected to the throttle valve 16 through a gearing (not shown), whereby the opening of the throttle valve 16 can be regulated. The motor 18 is controlled by an electronic control unit (ECU) 20.

The opening TH [degrees] of the throttle valve 16 is determined according to the rotation amount ROT [degrees] of a throttle grip 22 provided at a steering handle part of the vehicle 10, and the rotation amount ROT is detected by a potentiometer 24 connected to the throttle grip 22. The value detected by the potentiometer 24 is transmitted to the ECU 20, and the ECU 20 outputs a control signal Sc according to the detected value to the motor 18. The opening TH of the throttle valve 16 regulated by the motor 18 is detected by a throttle valve opening sensor 26, and the detected value is transmitted as an opening information signal So to the ECU 20.

In this embodiment, the engine output controller IT includes the ECU 20, the throttle grip 22, the potentiometer 24 and the throttle valve opening sensor 26.

Flow of Engine Output Control.

Figure 2:
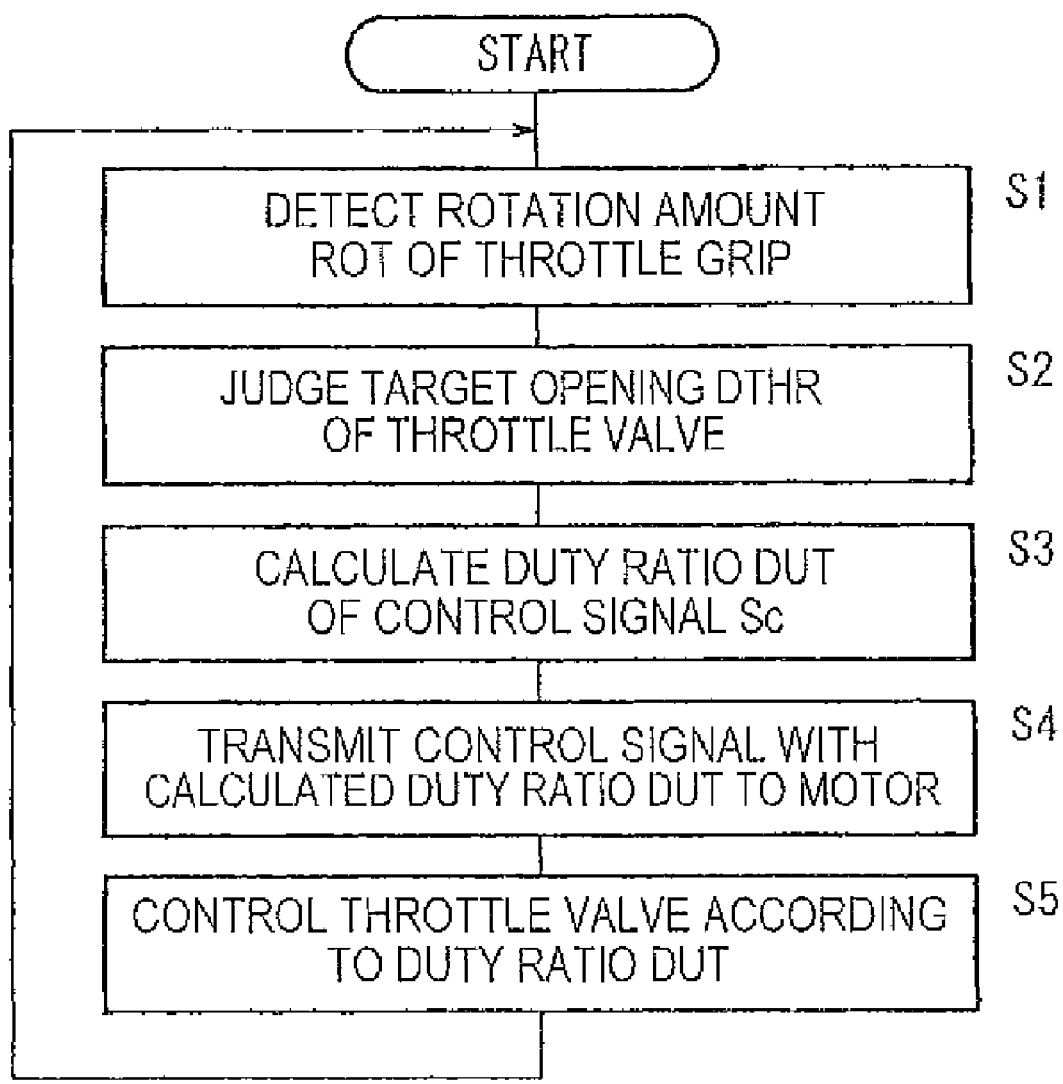
FIG. 2 is a flowchart for controlling the output of the engine by use of the engine output controller.

FIG. 2 shows a flowchart for regulating the opening of the throttle valve 16.

In step S1, when the throttle grip 22 is rotated by the driver in the condition where the engine 12 has been started, the rotation amount ROT [degrees] is detected by the potentiometer 24.

In step S2, the ECU 20 judges a target opening DTHR [degrees] of the throttle valve 16, based on the value detected by the potentiometer 24. The target opening DTHR is a target value for the actual opening DTH [degrees] indicating the opening relative to a default opening THDEF [degrees] (for example, 5 degrees) of the throttle valve 16. The actual opening DTH can be obtained by subtracting the default opening THDEF from the absolute opening TH [degrees] of the throttle valve 16 (DTH=TH−THDEF).

In step S3, the ECU 20 calculates a duty ratio DUT [%] for the control signal Sc to be outputted to the motor 18, and, in step S4, the ECU 20 transmits to the motor 18 the control signal Sc at the duty ratio DUT according to the results of the calculation executed in step S3. With the duty ratio DUT of the control signal Sc varied according to the calculation results, the output of the motor 18 is controlled. Specifically, the control signal Sc contains both signals for turning ON the motor 18 and signals for turning OFF the motor 18, and the presence ratio between the ON signals and the OFF signals within a fixed time is the duty ratio DUT. For example, in the case where the control signal Sc for a time of 1 millisecond contains the ON signals for a total time of 0.6 millisecond and the OFF signals for a total time of 0.4 millisecond, the duty ratio DUT is 60%. A specific method of calculating the duty ratio DUT will be described later.

In step S5, the motor 18, upon receiving the control signal Sc from the ECU 20, regulates the opening of the throttle valve 16 through an output according to the duty ratio DUT. As a result, air in a quantity according the actual opening DTH of the throttle valve 16 is supplied into the engine 12, and a fuel in an amount according to the quantity of the air is injected into the engine 12, whereby the output of the engine 12 is controlled.

The processes of steps S1 to S5 are repeated until the engine 12 is stopped.

Judgment of Target Opening DTHR (Step S2).

The target opening DTHR for the throttle valve 16 is determined according to the rotation amount ROT of the throttle grip 22. For example, the target opening DTHR can be determined in proportion to a pulse output from the potentiometer 24. Or, alternately, the target opening DTHR may be determined by any of the methods described in the patent documents.

Calculation of Duty Ratio DUT (Step S3).

The calculation of the duty ratio DUT as above-mentioned is carried out based on a sliding mode control similar to that in Japanese Patent Laid-open No. 2003-216206. The sliding mode control is detailed in "Sliding Mode Control—Design Theory of Nonlinear Robust Control—" (written by Kenzoh Nonami and Hiroki Den, published by Corona Publishing Co., Ltc., 1994), and is not detailed here.

In this embodiment, the duty ratio DUT is defined by the following formula (1):

$$DUT[k]=Ueq[k]+Urch[k]+Udamp[k]+Udutgap[k] \quad (1).$$

In the above formula (1), $Ueq[k]$ is equivalent control output, $Urch[k]$ is reaching output, $Udamp[k]$ is damping output, and $Udutgap[k]$ is hysteresis compensation output.

For describing the above-mentioned equivalent control output $Ueq[k]$, reaching output $Urch[k]$, damping output $Udamp[k]$, and hysteresis compensation output $Udutgap[k]$, basic terms will be defined in advance.

In the following description, a1, a2, b1, and c1 are model parameters determining the characteristics of a controlled system model (refers to Japanese Patent Laid-open No. 2003-216206, paragraph [0027], etc.).

In the following, e is the erroneous deviation [degrees] between the actual opening DTH and the target opening DTHR, and is defined by the following formula (2) (refer to Japanese Patent Laid-open No. 2003-216206, paragraph [0035], etc.):

$$e[k]=DTH[k]-DTHR[k] \quad (2).$$

VPOLE is a switching function setting parameter which is set as larger than −1 as well as smaller than 1 (refer to Japanese Patent Laid-open No. 2003-216906, paragraphs [0030], [0035], [0037], [0038], etc.).

σ is a switching function value, which is defined by the following formula (3) (refer to Japanese Patent Laid-open No. 2003-216206, paragraph [0035], etc.):

$$\sigma[k]=e[k]+VPOLE \cdot e[k-1]=(DTH[k]-DTHR[k])+VPOLE \cdot (DTH[k]-DTHR[k]) \quad (3).$$

The equivalent control output Ueq is an output for converging the erroneous deviation e between the actual opening DTH of the throttle valve 16 and the target opening DTHR to zero and constraining it on a switching straight line when the switching function value σ is zero, and the equivalent control output Ueq is defined by the following formula (4):

$$Ueq[k]=\{(1-a1-VPOLE) \cdot DTH[k]+(VPOLE-a2) \cdot DTH[k-1]+KDDTHR \cdot (DTHR[k]-DTHR[k-1])^2-c1\} \cdot (1/b1) \quad (4).$$

Here, the terms "$(1-a1-VPOLE) \cdot DTH[k]$", "$(VPOLE-a2) \cdot DTH[k-1]$" and "$-c1$" in the right-hand side and the coefficient "$1/b1$" in the right-hand side are the same as in the formula (8a) in the paragraph [0078] in Japanese Patent Laid-open No. 2003-216206, and their details are described in Japanese Patent Laid-open No. 2003-216206; therefore, detailed description of them is omitted here.

On the other hand, the term "$KDDTHR \cdot (DTHR[k]-DTHR[k-1])^2$" (hereinafter, the term as a whole will be referred to also as "the add-in amount x to the duty ratio DUT" or "the add-in amount x") in the right-hand side is a term characteristic of the present invention, and will be detailed below.

Here, the coefficient "KDDTHR" represents a positive coefficient (in this embodiment, it is "1"). The coefficient "$(DTHR[k]-DTHR[k-1])^2$" is the square of the difference between the current target opening DTHR[k] and the last target opening DTHR[k−1].

Figure 3:
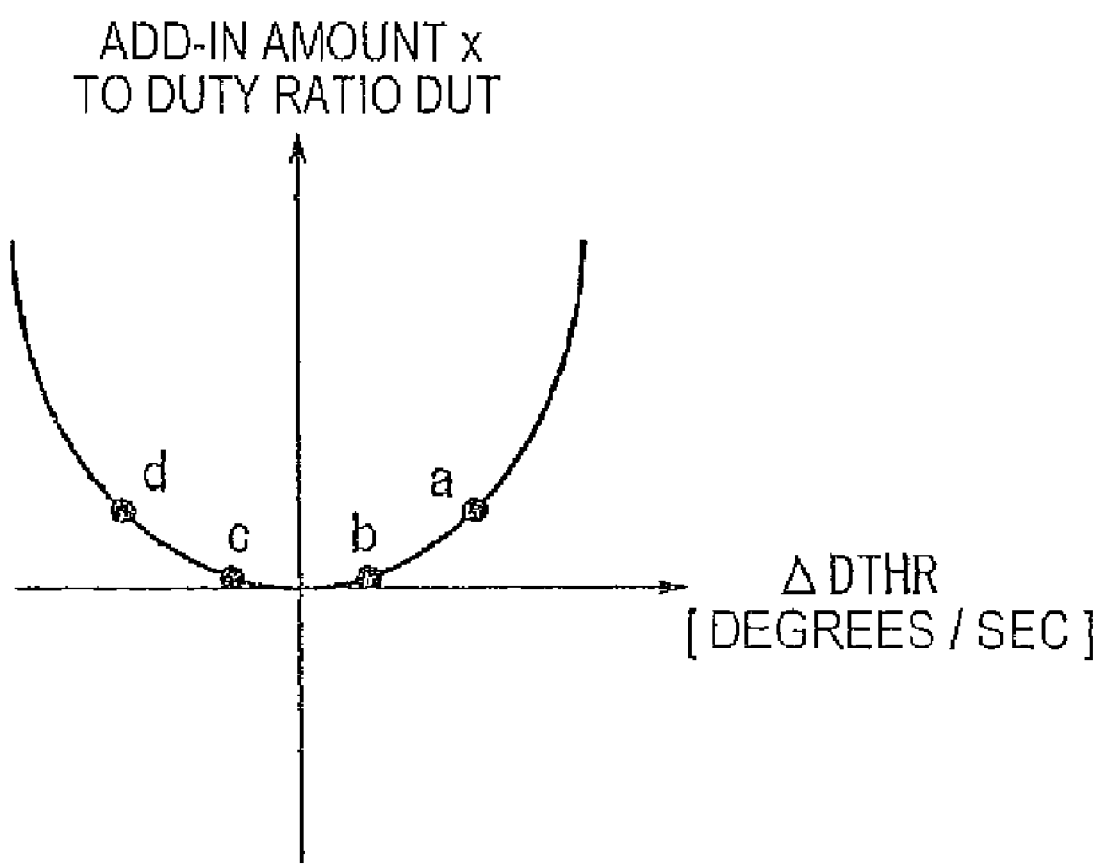
FIG. 3 shows the relationship between the speed variation of the target opening of a throttle valve and the add-in amount to the duty ratio of a control signal.

As shown in FIG. 3, the graph of the add-in amount x is a positive quadratic curve of which the vertex coincides with the origin, and the absolute value of the inclination of a tangent to the curve increases as the point of contact comes away from the origin. Therefore, in the region where the axis of abscissas is positive, the increment in the equivalent control output Ueq[k] (the add-in amount x to the duty ratio DUT) increases with an increase in the difference between the current target opening DTHR[k] and the last target opening DTHR[k−1] (namely, in the speed variation ΔDTHR [degrees/sec] of the target opening DTHR).

As a result, when the vehicle 10 is accelerated rapidly, the increment in the add-in amount x (the equivalent control output Ueq) increases and, hence, the duty ratio DUT also increases. Therefore, at the time of a rapid acceleration of the vehicle 10, the torque of the motor 18 is increased by an amount corresponding to the add-in amount x, so that the motor 18 opens the throttle valve 16 swiftly, whereby the output of the engine 12 can be increased rapidly.

Figure 4:
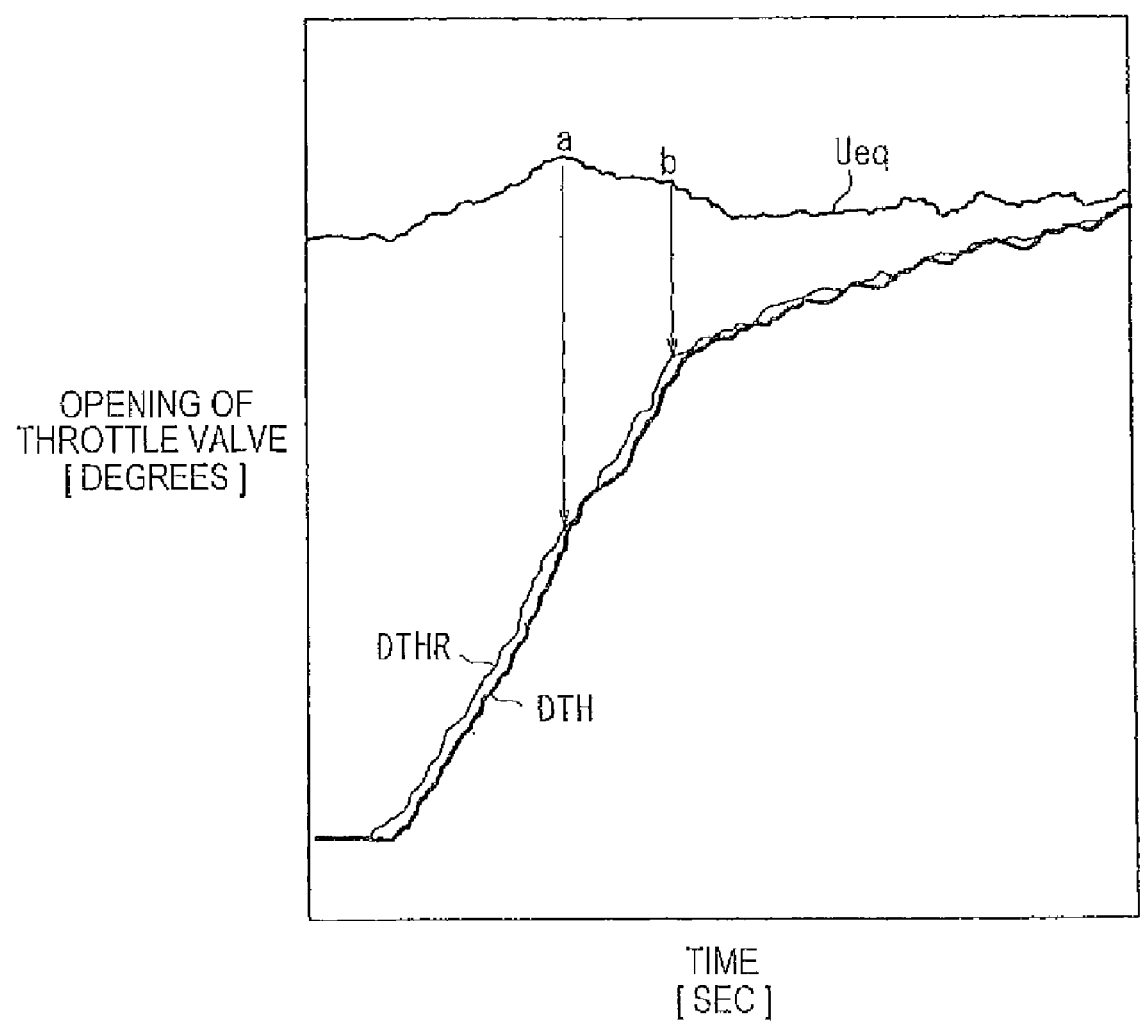
FIG. 4 shows specific waveforms of the target opening and the actual opening of the throttle valve and the equivalent control output at the time of vehicle acceleration.

FIG. 4 shows the target opening DTHR, the actual opening DTH and the equivalent control output Ueq when the vehicle 10 is accelerated. Points a and b in FIG. 4 correspond to points a and b in FIG. 3. As seen from FIG. 3, the speed variation ΔDTHR of the target opening DTHR is greater at point a than at point b. Besides, as shown in FIG. 4, the equivalent control output Ueq corresponding to point a is greater than the equivalent control output Ueq corresponding to point b. As a result, in FIG. 4, there is little difference between the target opening DTHR and the actual opening DTH.

On the other hand, in the region where the axis of abscissas is negative, the increment in the add-in amount x (the equivalent control output Ueq[k]) to the duty ratio DUT increases with an increase in the difference between the current target opening DTHR[k] and the last target opening DTHR[k−1]. Therefore, when the vehicle 10 is rapidly decelerated, the reduction in the duty ratio DUT is comparatively moderate. Accordingly, the minus torque exerted on the motor 18 at the time of rapid deceleration of the vehicle 10 is reduced by an amount corresponding to the add-in amount x, whereby the closing speed of the throttle valve 16 is lowered, resulting in that the output of the engine 12 can be reduced moderately.

Figure 5:
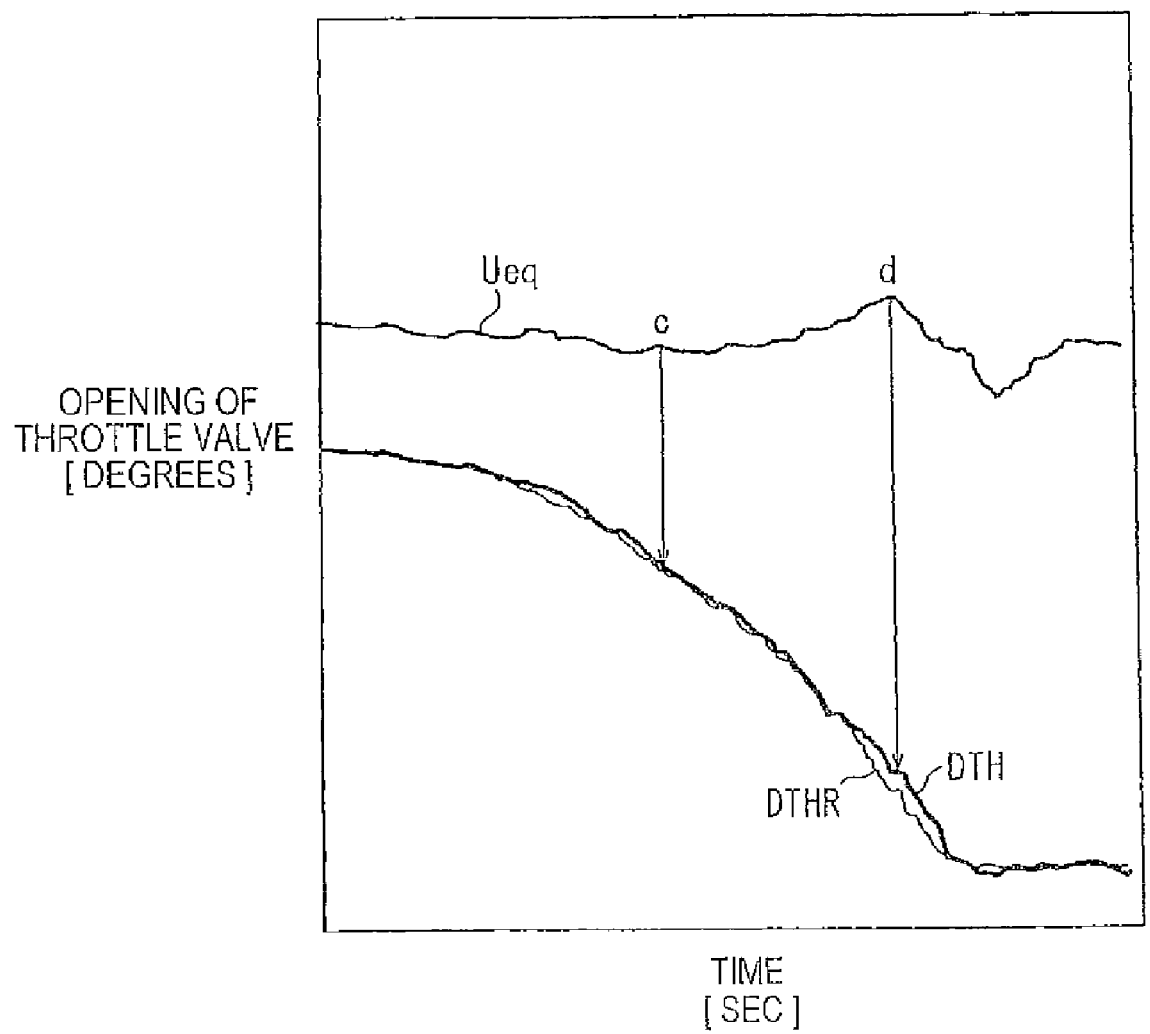
FIG. 5 shows specific waveforms of the target opening and the actual opening of the throttle valve and the equivalent control output at the time of vehicle deceleration.

FIG. 5 shows the target opening DTHR, the actual opening DTH and the equivalent control output Ueq when the vehicle 10 is decelerated. Points c and d in FIG. 5 correspond to points c and d in FIG. 3. As seen from FIG. 3, the speed variation ΔDTHR of the target opening DTHR is smaller at point d than at point c (the absolute value of the speed variation ΔDTHR is greater at point d). Besides, as shown in FIG. 5, the equivalent control output Ueq corresponding to point d is greater than the equivalent control output Ueq corresponding to point c. As a result, in FIG. 5, there is little difference between the target opening DTHR and the actual opening DTH.

The reaching output Urch is an output for constraining the switching function value σ to zero, and is defined by the following formula (5):

$$Urch[k]=(-F/b1)\cdot\sigma[k] \qquad (5).$$

This formula (5) is like the formula (9a) in Japanese Patent Laid-open No. 2003-216206, and detailed description thereof is omitted here.

The damping output Udamp is an output for preventing the actual opening DTH from overshooting the target opening DTHR, and is defined by the following formula (6):

$$Udamp[k]=-Kdamp\cdot(\sigma[k]-\sigma[k-1])/b1 \qquad (6).$$

Here, Kdamp is a gain characteristic value, and is defined by the following formula (7):

$$Kdamp=T\_Kdump1\cdot T\_Kdump2 \qquad (7).$$

Figure 6:
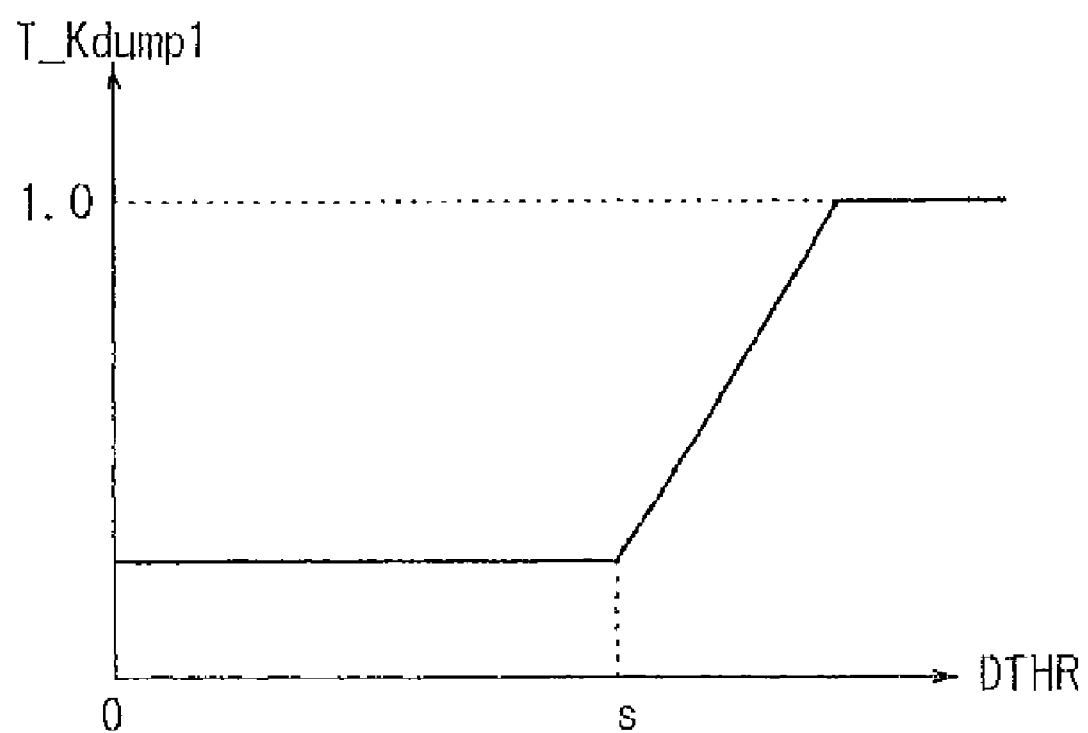
FIG. 6 shows the relationship between the target opening of the throttle valve and the output gain.

The gain characteristic value T_Kdump1, as shown in FIG. 6, is a positive gain characteristic value which is enlarged when the target opening DTHR of the throttle valve 16 exceeds a positive predetermined value s. Since the gain characteristic value T_Kdump2 has a positive value as described later and the gain characteristic value Kdamp is multiplied by −1 (refer to the formula (6)), the gain characteristic value T_Kdump1 is enlarged in the plus direction when the opening of the throttle valve 16 is enlarged, and, as a result, the damping output Udamp is enlarged in the minus direction. Therefore, by use of the gain characteristic value T_Kdump1, it is possible to prevent the overshoot upon rapid acceleration of the vehicle 10.

Figure 7:
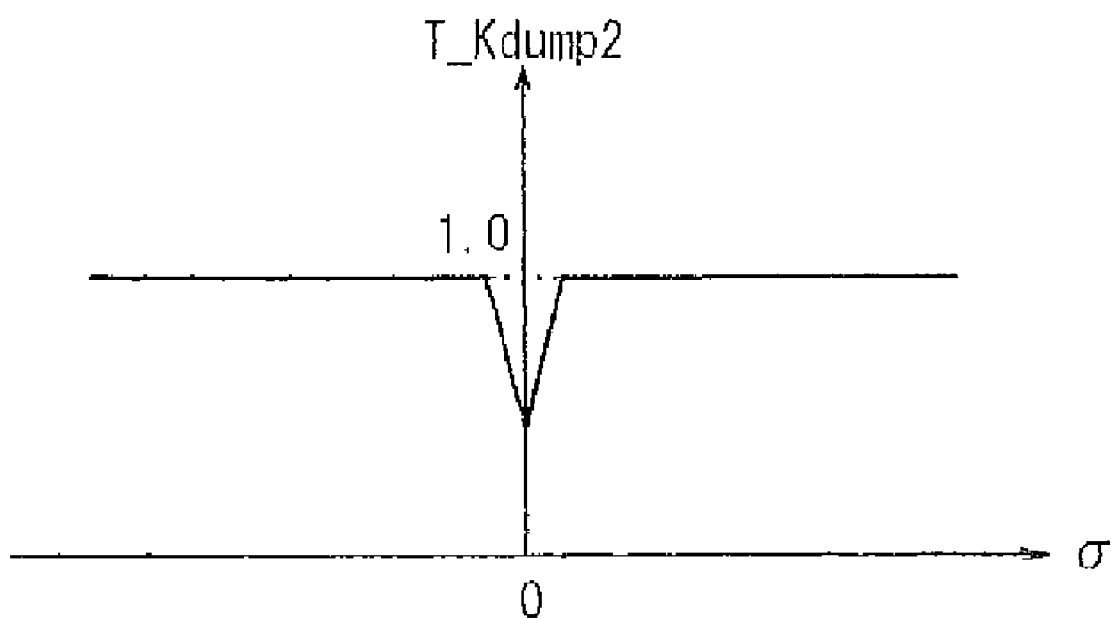
FIG. 7 shows the relationship between the switching function value and the output gain.

In addition, the gain characteristic value T_Kdump2, as shown in FIG. 7, is a positive gain characteristic value which is reduced when the switching function value σ is in the vicinity of zero. Since the gain characteristic value T_Kdump1 has a positive value as described above and the gain characteristic value Kdamp is multiplied by −1, the gain characteristic value T_Kdump2 is enlarged when the switching function value σ has a value far from zero, with the result that the value of the damping output Udamp is enlarged. Therefore, when the switching function value σ has a value far from zero, i.e., when the robust property is small, the absolute value of the damping output Udamp can be made to be large, whereby the switching function value σ can be brought close to the switching straight line, thereby enhancing the robust property.

In this embodiment, by storing the gain characteristic value T_Kdump1 and the gain characteristic value T_Kdump2 in a table form, it is possible to calculate the gain characteristic value Kdamp swiftly.

Figure 8:
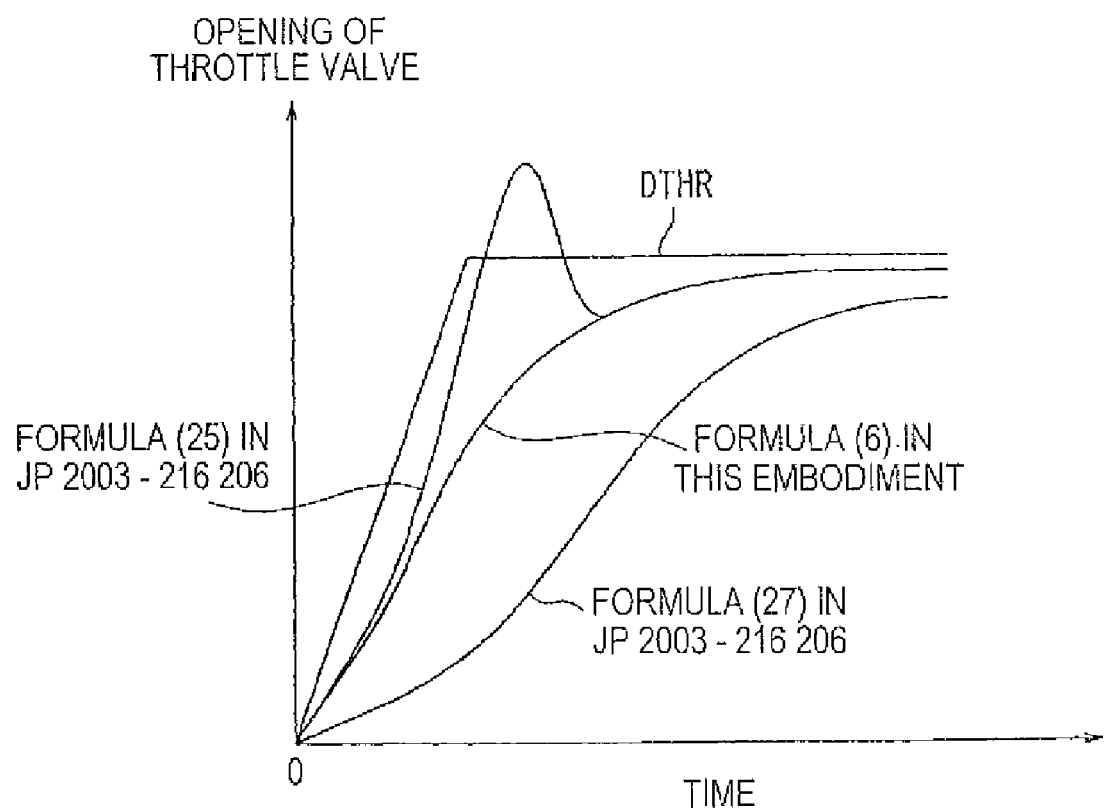
FIG. 8 shows a exemplary comparison of the target opening of the throttle valve with the actual opening obtained by use of a damping output according to the present invention and the actual opening based on the related art.

Incidentally, FIG. 8 shows a diagram for comparing the target opening DTHR with the actual opening DTH obtained by use of the damping output Udamp based on the formula (6) and the actual opening DTH obtained by use of the damping outputs Udamp based on the formula (25) and the formula (27) in Japanese Patent Laid-open No. 2003-216206.

As seen from FIG. 8, the actual opening DTH obtained by use of the damping output Udamp based on the formula (25) in Japanese Patent Laid-open No. 2003-216206 overshoots the target opening DTHR. In addition, the actual opening DTH obtained by use of the damping output Udamp based on the formula (6) hereiniabove realizes a higher-speed follow-up performance, as compared with the actual opening DTH obtained by use of the damping output Udamp based on the formula (27) in Japanese Patent Laid-open No. 2003-216206.

The hysteresis compensation output Udutgap is an output obtained by taking into account the hysteresis in regulation of the opening of the throttle valve 16, and is defined by the following formula (8):

$$Udutgap[k]=\{DUTR(DTH[k])-(Ueq[k]+Urch[k]+Udamp[k])\}\cdot Kdut/b1 \qquad (8).$$

Figure 9A:
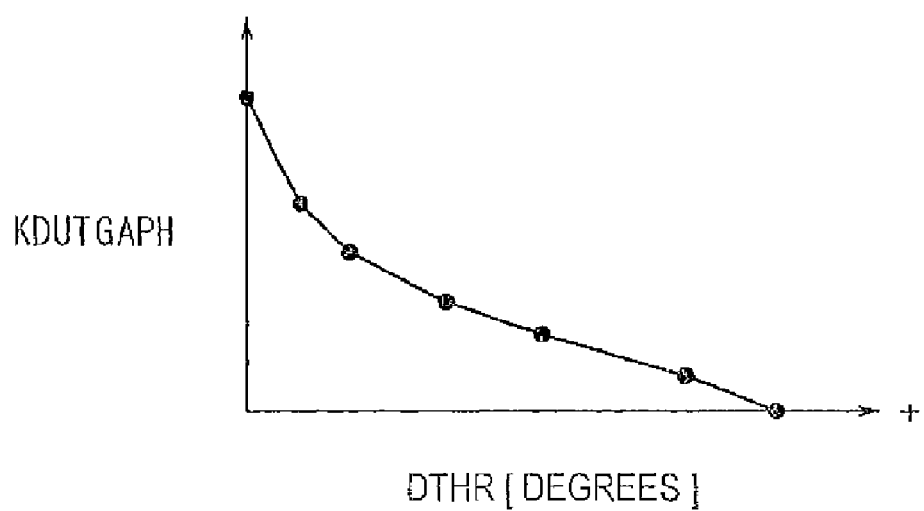
FIGS. 9A and 9B are characteristic diagrams of coefficients used in determining the damping output according to the present invention.
Figure 9B:
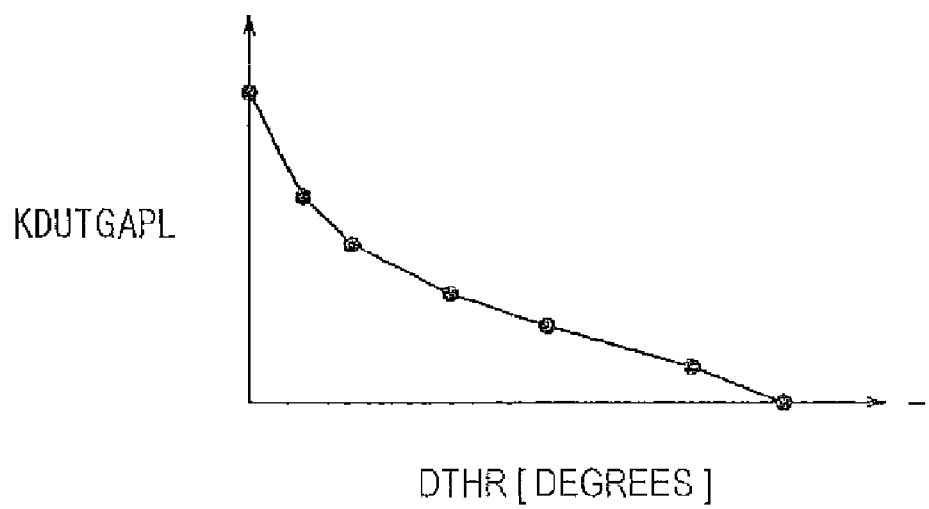

Here, DUTR(DTH[k]) is the value of the duty ratio DUT necessary for operating the throttle valve 16 according to the value of the actual opening DTH[k]. In addition, Kdut includes a coefficient KDUTGAPH and a coefficient KDUTGAPL, and these coefficients KDUTGAPH and KDUTGAPL are functions of the target opening DTHR, as shown in FIGS. 9A and 9B.

Figure 10:
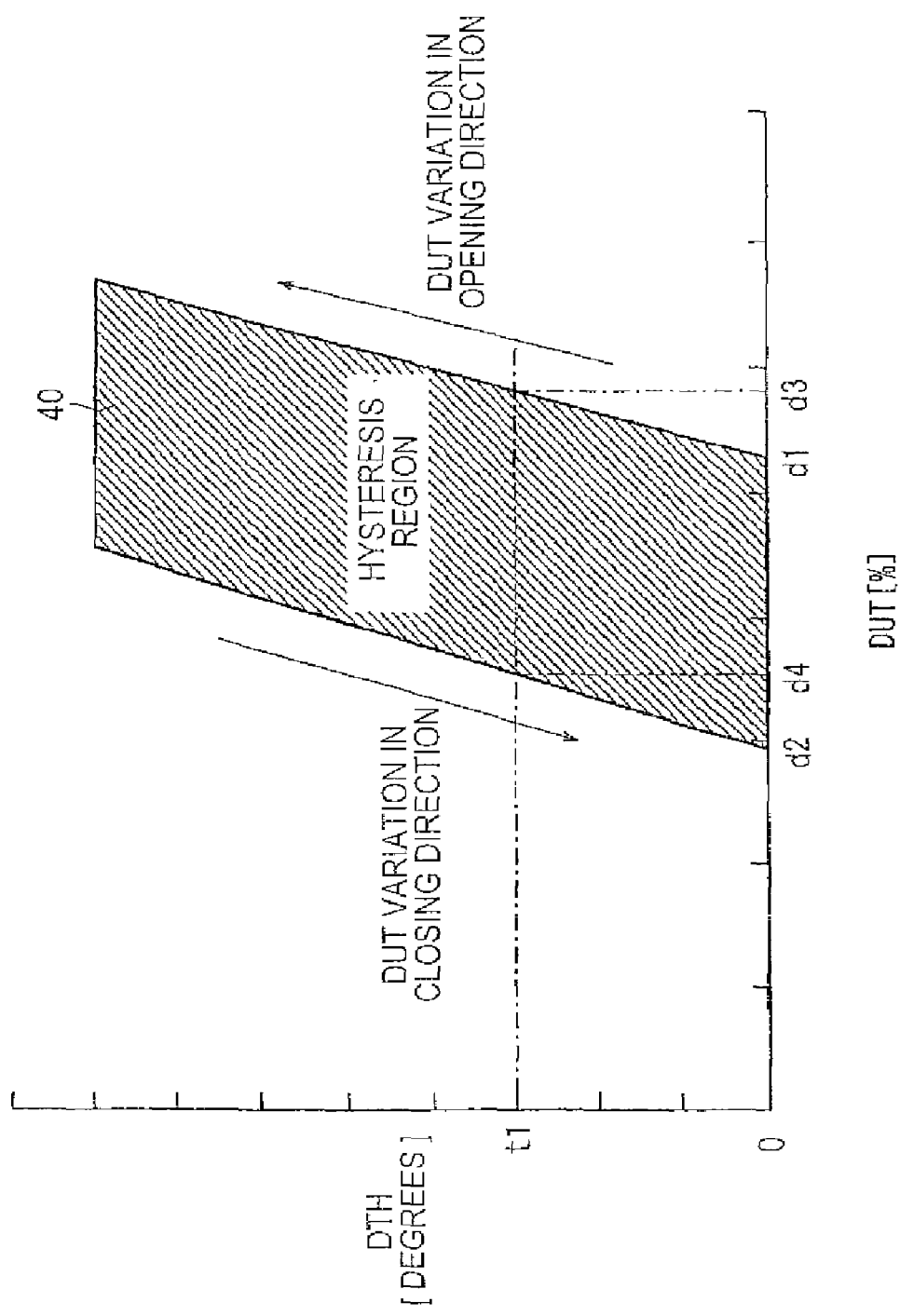
FIG. 10 shows a hysteresis characteristic in the relationship between the duty ratio of the control signal and the actual opening of the throttle valve.

Regulation of the opening of the throttle valve 16 by the motor 18 involves a hysteresis characteristic as shown in FIG. 10. Specifically, when the point determined by the duty ratio DUT and the actual opening DTH lies in a hysteresis region 40, the motor 18 does not perform the regulation of the opening. For example, in the case where the throttle valve 16 is in its initial position (DTH=0), the throttle valve 16 starts operating in the opening direction at the time when the duty ratio DUT of the control signal Sc sent from the ECU 20 to the motor 18 is d1 [%]. On the other hand, in the case of operating the throttle valve 16 in the closing direction, the throttle valve 16 returns to its initial position at the time when the duty ratio DUT is d2 [%], which is smaller than d1.

Similarly, in the case where the throttle valve 16 is held (stopped) with the actual opening DTH in the state of t1 [degrees], the duty ratio DUT must be d3 [degrees] in order to operate the throttle valve 16 in the opening direction. On the other hand, it suffices that the duty ratio DUT is d4 (which is smaller than d3) in order to operate the throttle valve 16 in the closing direction.

Incidentally, the main factors which are considered to cause the above-mentioned hysteresis characteristics include a factor intrinsic of the motor, friction in the mechanical system, and energization by the return spring. The factor intrinsic of the motor is the current value at which the motor starts operating, and the current value varies depending on such factors as the positions, shapes, materials and the like of the winding, the core and the like. The friction in the mechanical system includes the friction between the shaft of the motor and the bearing, and the friction between the plurality of gears in the motor. The energization by the return spring is the energization of the throttle valve in the closing direction by the return spring connected to the throttle valve.

In addition, the hysteresis characteristic as shown in FIG. 10 appears when the duty ratio DUT [%] is varied in a fixed manner, and another hysteresis characteristic appears when the variation in the duty ratio DUT is varied.

Figure 11:
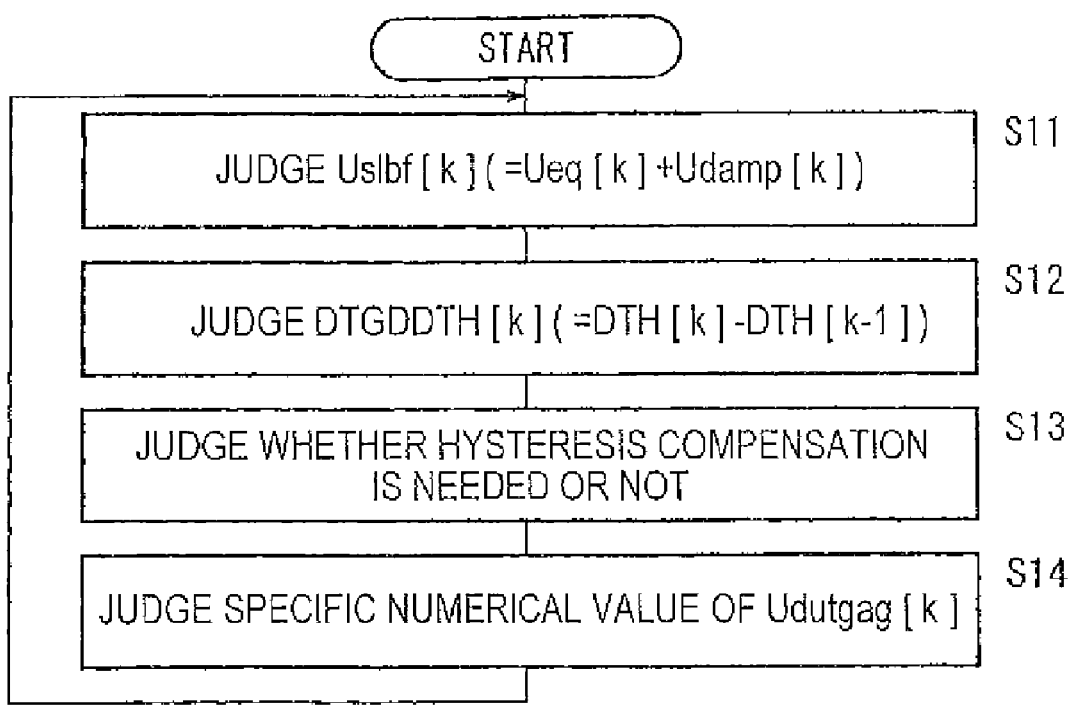
FIG. 11 is a flowchart for judging the hysteresis compensation output according to the present invention.

FIG. 11 shows a flowchart for judging the hysteresis compensation output Udutgap[k].

In step S11, the ECU 20 calculates an output Uslbf (Uslbf [k]=Ueq[k]+Urch[k]+Udamp[k]) obtained by other outputs constituting the duty ratio DUT of the above formula (1) than the hysteresis compensation output Udutgap, i.e., the equivalent control output Ueq, the reaching output Urch and the damping output Udamp.

In step S12, the ECU 20 calculates the difference DTGDDTH[k] (DTGDDTH[k]=DTH[k]−DTH[k−1]) between the current actual opening DTH[k] and the last actual opening DTH[k−1].

In step S13, the ECU 20 judges whether the hydteresis compensation is needed or not.

In step S14, the ECU 20 judges a specific numerical value of the hysteresis compensation output Udutgap.

Figure 12:
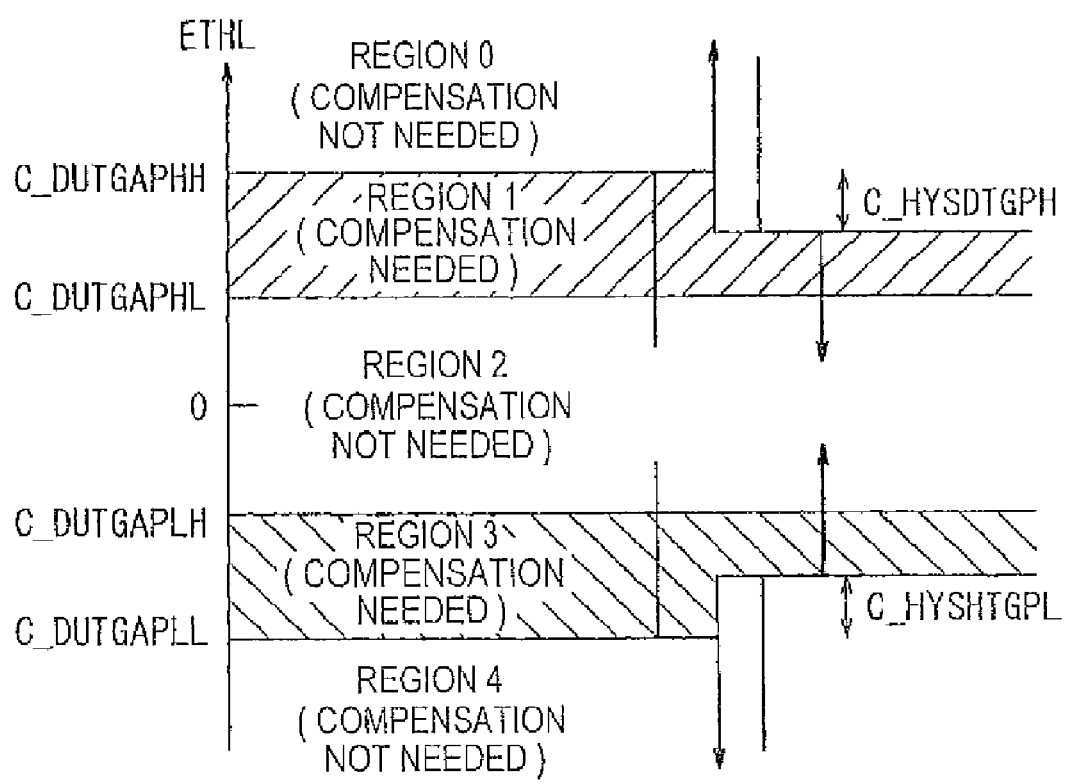
FIG. 12 shows the regions corresponding to whether a hysteresis compensation is needed or not.

As above-mentioned, in step S13, it is judged whether the hysteresis compensation is needed or not. Specifically, as shown in FIG. 12, the ECU 20 presets five regions (region 0 to region 5) for the difference ETHL[k] [degrees] between the target opening DTHR[k] and the actual opening DTH[k], and detects that one of the regions 0 to 5 in which the current difference ETHL lies, thereby judging whether the hysteresis compensation is needed or not.

More specifically, in the case where the difference ETHL is not less than a positive threshold C_DUTGAPHH (this condition is referred to as "region 0"), it is considered that the driver is wanting a very high engine output and that the actual opening DTH of the throttle valve 16 will soon come out of the hysteresis region 40 (FIG. 10), and, therefore, the ECU 20 does not perform the hysteresis compensation. Incidentally, on the basis of hysteresis characteristic, the threshold C_DUTGAPHH has one value at the time of an increase in the difference ETHL and another value at the time of a decrease in the difference ETHL.

Specifically, the threshold C_DUTGAPHH is set to be comparatively high for the time when the difference ETHL increases, and the threshold C_DUTGAPHH is set to be comparatively low for the time when the difference ETHL decreases. The difference between the higher value and the lower value is represented by C_HYSDTGPH.

In the case where the difference ETHL is less than the positive threshold C_DUTGAPHH and is more than a positive threshold C_DUTGAPHL (0<C_DUTGAPHL<C_DUTGAPHH) (this condition is referred to as "region 1", except for the exception described below), the ECU 20 judges that the engine output cannot be obtained due to the hysteresis notwithstanding the driver is wanting a moderate acceleration, and basically performs a hysteresis compensation such as to increase the duty ratio DUT of the control signal Sc. It is to be noted here, however, that in the case where the target duty ratio DUTTGTH [%] for the next control signal Sc is less than the output Uslbf (Uslbf=Ueq+Urch+Udamp) obtained in step S11 even though such a hysteresis compensation is not conducted (this case belongs to "region 0"), the hysteresis compensation is not performed.

In the case where the difference ETHL is not more than the positive threshold C_DUTGAPHL and is not less than a negative threshold C_DUTGAPLH (this condition is referred to as "region 2"), the ECU 20 judges that the opening of the throttle valve 16 has not changed, and does not perform any hysteresis compensation.

In the case where the difference ETHL is less than the negative threshold C_DUTGAPLH and is more than a negative threshold C_DUTGAPLL (C_DUTGAPLL<C_DUTGAPLH<0) (this condition is referred to as "region 3", except for the exception described below), the ECU 20 judges that the engine output would be enlarged due to the hysteresis notwithstanding the driver is wanting a moderate deceleration, and performs a hysteresis compensation such as to reduce the duty ratio DUT of the control signal Sc. It is to be noted here, however, that in the case where the next target duty ratio DUTTGTL [%] is less than the output Uslbf (Uslbf=Ueq+Urch+Udamp) obtained in step S11 even though such a hysteresis compensation is not conducted (this case belongs to "region 4"), the hysteresis compensation is not performed.

In the case where the difference ETHL is not more than the negative threshold C_DUTGAPLL (this condition is referred to as "region 4"), the hysteresis compensation is not conducted. Incidentally, on the basis of hysteresis characteristic, the threshold C_DUTGAPLL has one value at the time of an increase in the difference ETHL and another value at the time of a decrease in the difference ETHL. Specifically, the threshold C_DUTGAPLL is set to be comparatively low (enlarged in the minus direction) for the time when the difference ETHL increases (varies in the minus direction), and the threshold C_DUTGAPLL is set to be comparatively high (reduced in the minus direction) for the time when the difference ETHL decreases (varies in the positive direction). The difference between the higher value and the lower value is represented by C_HYSDTGPL.

Figure 13:
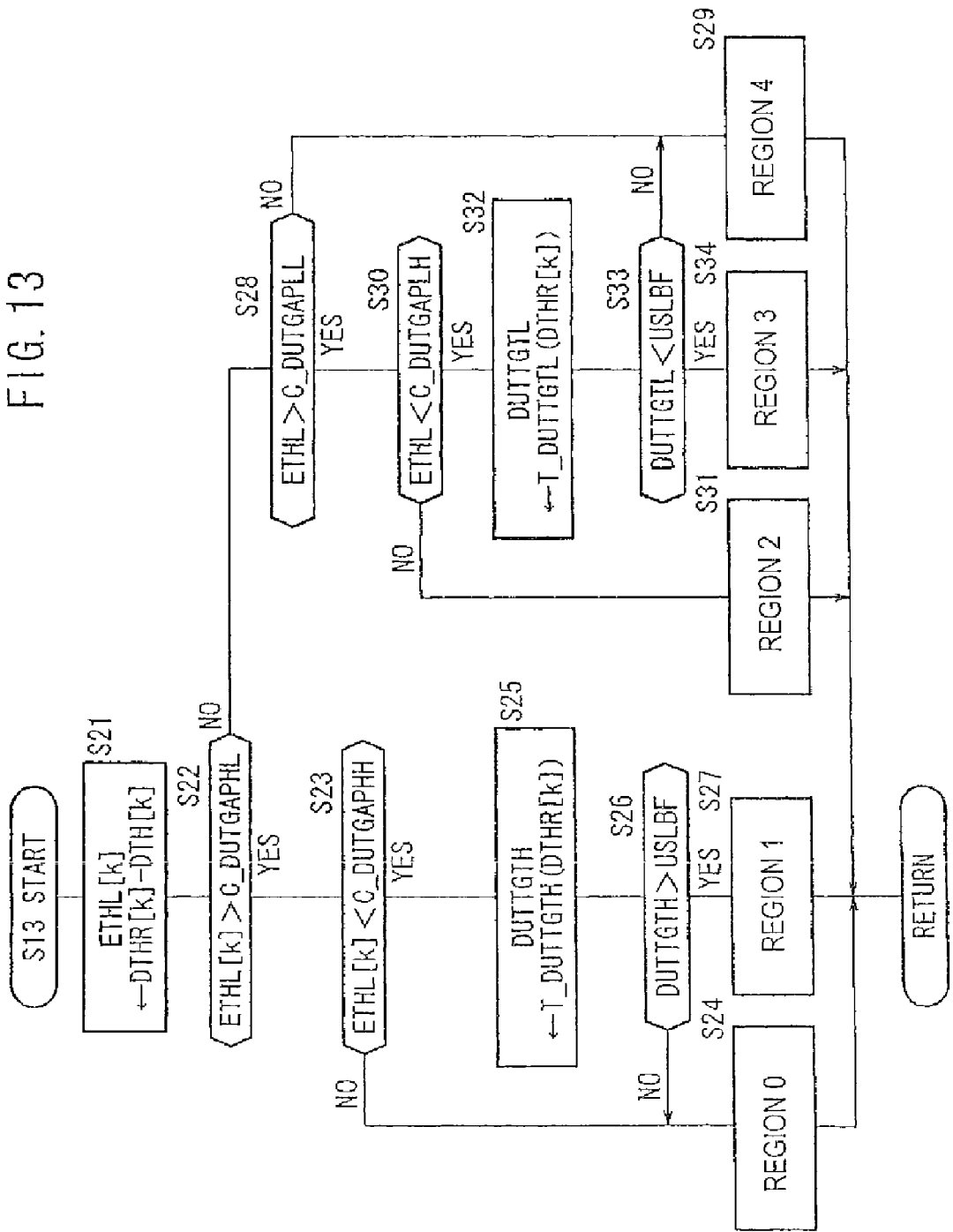
FIG. 13 is a flowchart for judging the regions.

FIG. 13 shows a flowchart for a process in the above-mentioned step S13 (a process for judging regions 0 to 5 in FIG. 12).

Specifically, in step S21, the ECU 20 calculates the difference ETHL[k] (ETHL[k]=DTHR[k]−DTH[k]) between the current target opening DTHR[k] and the current actual opening DTH[k].

In step S22, the ECU 20 judges whether or not the difference ETHL[k] is larger than the positive threshold C_DUTGAPHL (see FIG. 12) which is for judging whether a movement in the opening direction made by the throttle valve 16 is intended or not. In the case where the difference ETHL[k] is larger than the threshold C_DUTGAPHL, step S23 is entered, whereas in the case where the difference ETHL[k] is not more than the threshold C_DUTGAPHL, step S28 is entered.

In step S23, the ECU 20 judges whether or not the difference ETHL[k] is smaller than the positive threshold C_DUTGAPHH which is for judging whether or not the throttle valve 16 actually moves in the opening direction. In the case where the difference ETHL[k] is not less than the positive threshold C_DUTGAPHH, step S24 is entered, and the ECU 20 judges that the movement in the opening direction made by the throttle valve 16 is so large that no hysteresis compensation is needed, in other words, the difference ETHL lies in region 0 in FIG. 12 and no hysteresis compensation is needed. On the other hand, in the case where the difference ETHL[k] is judged to be smaller than the threshold C_DUTGAPHH in step S23, step S25 is entered.

In step S25, the ECU 20 judges a target duty ratio DUTTGTH [%] necessary for actually moving the throttle valve 16 in the opening direction, according to the target opening DTHR. The target duty ratio DUTTGTH is preliminarily stored in a memory (not shown) on the basis of each target openings DTHR.

In step S26, the ECU 20 judges whether or not the target duty ratio DUTTGTH is larger than the output Uslbf (Uslbf=Ueq+Urch+Udamp) which has been judged in step S11. In the case where the target duty ratio DUTTGTH is not more than the output Uslbf, step S24 is entered, and the ECU 20 judges that the target duty ratio DUTTGTH is in region 0 outside the hysteresis region 40 and that no hysteresis compensation is needed. In the ease where the target duty ratio DUTTGTH is larger than the output Uslbf step S27 is entered, and the ECU 20 judges that the target duty ratio DUTTGTH is in region 1 inside the hysteresis region 40 and that a hysteresis compensation is needed.

As above-mentioned, in the case where it is judged in step S22 that the difference ETHL[k] is not more than the threshold C_DUTGAPHL, step S28 is entered.

In step S28, the ECU 20 judges whether or not the difference ETHL[k] is larger than the threshold C_DUTGAPLL, in order to judge whether or not the movement in the closing direction made by the throttle valve 16 needs a hysteresis compensation. In the case where the difference ETHL[k] is not more than the threshold C_DUTGAPLL, step S29 is entered, and the ECU 20 judges that the movement in the closing direction made by the throttle valve 16 is so large as not to need any hysteresis compensation, in other words, the difference ETHL is in region 4 in FIG. 12 and no hysteresis compensation is needed. On the other hand, in the case where it is judged in step S28 that the difference ETHL[k] is larger than the threshold C_DUTGAPLL, step S30 is entered.

In step S30, the ECU 20 judges whether or not the difference ETHL is less than the threshold C_DUTGAPLH. In the case where the difference ETHL is not less than the threshold C_DUTGAPLH, step S31 is entered, and it is judged that the current situation is region 2. Where the difference ETHL is less than the threshold C_DUTGAPLH, step S32 is entered.

In step S32, the ECU 20 judges a target duty ratio DUTTGTL [%] necessary for actually moving the throttle valve 16 in the closing direction, according to the target opening DTHR. The target duty ratio DUTTGTL is preliminarily stored in a memory (not shown) on the basis of each target opening DTHR.

In step S33, the ECU 20 judges whether or not the target duty ratio DUTTGTL is less than the output Uslbf (Uslbf=Ueq+Urch+Udamp) which has been judged in step S11. In the case where the target duty ratio DUTTGTL is not less than the output Uslbf, step S29 is entered, and the ECU 20 judges that the target duty ratio DUTTGTL is in region 4 outside the hysteresis region 40 and that no hysteresis compensation is needed. Where the target duty ratio DUTTGTL is less than the output Uslbf, step S34 is entered, and the ECU 20 judges that the target duty ratio DUTTGTL is in region 3 inside the hysteresis region 40 and that a hysteresis compensation is needed.

Figure 14:
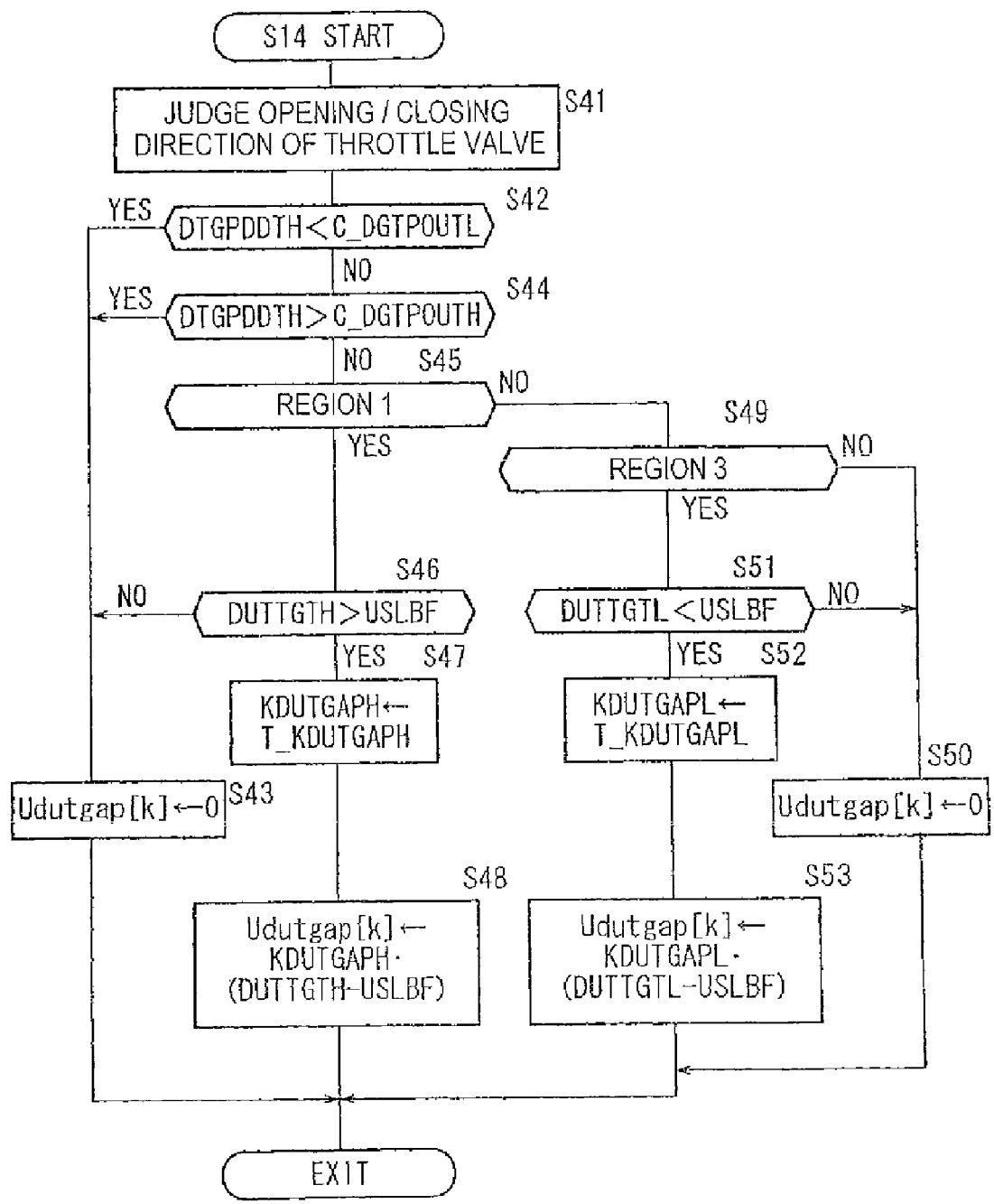
FIG. 14 is a flowchart for judging a specific numerical value of the hysteresis compensation output used in hysteresis compensation.

FIG. 14 shows a flowchart for the ECU 20 to judge the specific numerical value of the hysteresis compensation output Udutgap[k].

In step S41, the ECU 20 judges the moving direction of the throttle valve 16. Specifically, the ECU 20 judges the moving direction of the throttle valve 16 by detecting whether the speed variation DTGDDRTHR [degrees/sec] of the target opening DTH is positive or negative. Or, alternatively, in consideration of an error, instead of simply detecting whether the speed variation DTGDDRTHR is positive or negative, the moving direction of the throttle valve 16 may be judged according to whether or not the speed variation DTGDDRTHR exceeds each of a positive predetermined value and a negative predetermined which are preliminarily set.

In step S42, it is judged whether or not the speed variation DTGDDTH [degrees/sec] of the actual opening DTH is larger than a negative threshold C_DGTPOUTL [degrees/sec]. The negative threshold C_DGTPOUTL is for judging whether a hysteresis compensation is needed or not in the case of a closing operation of the throttle valve 16.

In the case where the speed variation DTGDDTH is smaller than the threshold C_DGTPOUTL, step S43 is entered, and the hysteresis compensation output Udutgap[k] is set to zero. Where the speed variation DTGDDTH is not less than the negative threshold C_DGTPOUTL, step S44 is entered.

In step S44, like in step S43, it is judged whether or not the speed variation DTGDDTH of the actual opening DTH is larger than a positive threshold C_DGTPOUTH. In the case where the speed variation DTGDDTH is larger than the positive threshold C_DGTPOUTH, step S43 is entered, and the hysteresis compensation output Udutgap[k] is set to zero. Where the speed variation DTGDDTH is not more than the positive threshold C_DGTPOUTH, step S45 is entered.

In step S45, the ECU 20 judges whether or not the difference ETHL is in region 1. In the case where the difference ETHL is in region 1, step S46 is entered; on the other hand, where the difference ETHL is not in region 1, step S49 is entered.

In step S46, the ECU 20 judges whether or not the target duty ratio DUTTGTH at the time of opening the throttle valve 16 is larger than the sum Uslbf (Uslbf=Ueq+Urch+Udamp) which has been calculated in step S11. Where the target duty ratio DUTTGTH is not more than the sum Uslbf, step S43 is entered, and the hysteresis compensation output Udutgap is set to zero. Where the target duty ratio DUTTGTH is larger than the sum Uslbf, step S47 is entered.

In step S47, the ECU 20 reads a coefficient KDUTGAPH from a preset table T_KDUTGAPH. The coefficient KDUTGAPH is included in the above-mentioned function Kdut, and has the characteristic as shown in FIG. 9A. Specifically, the coefficient KDUTGAPH has such a characteristic that it decreases with an increase in the target opening DTHR of the throttle valve 16.

In step S48, the ECU 20 calculates a hysteresis compensation output Udutgap by use of the following formula (9):

$$Udutgap[k]=KDUTGAPH(DTHR[k])\cdot(DUTTGTH[k]-USLBF[k]) \quad (9)$$

In the case where it is judged in step S45 that the difference ETHL is not in region 1, it is judged in step S49 whether or not the difference ETHL is in region 3. Where the difference ETHL is not in region 3, step S50 is entered, in which Udutgap[k] is set to zero. Where the difference ETHL is in region 3, step S51 is entered.

In step S51, the ECU 20 judges whether or not the target duty ratio DUTTGTL is smaller than the sum Uslbf (Uslbf=Ueq+Urch+Udamp) which has been calculated in step S11. In the case where the target duty ratio DUTTGTH is not smaller than the sum Uslbf, step S50 is entered, in which the hysteresis compensation output Udutgap is set to zero. Where the target duty ratio DUTTGTH is smaller than the sum Uslbf, step S52 is entered.

In step S52, the ECU 20 reads a coefficient KDUTGAPL from a preset table. The coefficient KDUTGAPL is included in the above-mentioned function Kdut, and has a characteristic as shown in FIG. 9B. Specifically, the coefficient KDUTGAPL has such a characteristic as to decrease with a decrease in the target DTHR of the throttle valve 16. Incidentally, it is to be noted that, in FIG. 9B, the positive/negative sense of the axis of abscissas is reversed.

In step S53, the ECU 20 calculates the hysteresis compensation output Udutgap by use of the following a formula (10):

$$Udutgap[k]=KDUTGAPL(DTHR[k])\cdot(DUTTGTL[k]-USLBF[k]) \quad (10)$$

As has been described above, in the engine output controller 11 according to this embodiment, the ECU 20 performs both the process of increasing the output of the motor 18 by increasing the add-in amount x to the duty ratio DUT of the control signal Sc according to the increase in the speed variation ΔDTHR of the target opening DTHR when the speed variation ΔDTHR is positive and the process of decreasing the output of the motor 18 by increasing the add-in amount x to the duty ratio DUT of the control signal Sc according to the decrease in the speed variation ΔDTHR when the speed variation ΔDTHR is negative.

In the embodiment as above, when the speed variation ΔDTHR of the target driving amount DTHR is positive, the increase in the motor output attendant on the increase in the speed variation ΔDTHR is added to the increase in the motor output due to the increase in the target opening DTHR. As a result, the output of the motor 18 is more enlarged at the time of rapid acceleration, and the actual opening DTH of the throttle valve 16 is also more increased accordingly. Therefore, it is possible to enhance the response performance in control of the actual opening DTH, and, as a result, to enhance the response performance of the engine output.

In addition, in this embodiment, when the speed variation ΔDTHR of the target opening DTHR is negative, the decrease in the output of the motor 18 is restrained according to the decrease in the speed variation ΔDTHR. Therefore, the decrease in the output of the motor 18 is slowed at the time of rapid deceleration, and it is possible to prevent an erroneous deviation in control of the actual opening DTH of the throttle valve 16 (an overshoot of the actual opening DTH relative to the target opening DTHR) accordingly. As a result, an erroneous deviation of the engine output can also be prevented from occurring.

Furthermore, the ECU 20 determines the add-in amount x to the duty ratio DUT of the control signal Sc in each of the two processes by use of a positive quadratic function of the speed variation ΔDTHR. In the graph of a positive quadratic function, the absolute value of the inclination of a tangent thereto is increased as the point of contact comes away from the vertex of the graph. Therefore, when the speed variation ΔDTHR is near zero, i.e., when a moderate acceleration or deceleration is being conducted, it is possible to slowly increase or decrease the actual opening DTH of the throttle valve 16 and, as a result, to slowly increase or decrease the engine output, so that the drivability of the vehicle 10 is enhanced. In addition, it is possible to slowly increase the actual opening DTH of the throttle valve 16, and to prevent an excessive acceleration (an overshoot of the actual opening relative to the target opening).

Further, when the speed variation ΔDTHR is positive and is far from zero, i.e., when a rapid acceleration operation is being conducted, it is possible to rapidly increase or decrease the actual opening DTH of the throttle valve 16, and to realize a high response performance according to the driver's demand. Furthermore, when the speed variation ΔDTHR is negative and is far away from the origin, i.e., when a rapid deceleration operation is being conducted, it is possible to prevent an excessive decrease in the actual opening DTHR (an overshoot of the actual opening DTH relative to the target opening DTHR) from occurring.

Incidentally, the present invention is not limited to the above-described embodiment, and various configurations can naturally be adopted based on the contents of the present specification. For example, the configurations as described in the following (1) to (5) can be adopted.

(1) Vehicle

While the vehicle 10 has been a motorcycle in the above-described embodiment, this is not limitative. For example, the vehicle may be a four-wheel vehicle.

(2) Target Driving Amount Input Means

While the throttle grip 22 has been used as a means for inputting the target opening DTHR in the above-described embodiment, this is not limitative. For example, an accelerator pedal may also be used as the input means. In addition, while the throttle grip 22 and the potentiometer 24 have been described as separate elements in the above-described embodiment, they may be of an integral form.

(3) Control Method

While a sliding mode control has been used as a control method in the above-described embodiment, this is not limitative. For example, a nonlinear robust control other than the sliding mode control or a linear robust control may also be used.

(4) Control Signal

While the output of the motor 18 has been controlled by use of the duty ratio DUT of the control signal Sc, the output of the motor 11 can be varied also by modifying other output characteristic than the duty ratio DUT. For example, the output of the motor 18 can also be varied by varying the number of pulses, the amplitude or the frequency of the control signal Sc.

While the value of a part of the equivalent control output Ueq has been determined by use of a quadratic function in the above-described embodiment, this is not limitative and use may be made of any technique that varies the output characteristic of the control signal Sc according to the speed variation ΔDTHR of the target opening DTHR. For example, the output of the control signal Sc can be varied also by use of a linear function. In this case, preferably, a linear function with a positive inclination is adopted when the speed variation ΔDTHR of the target opening DTHR takes a positive value, and a linear function with a negative inclination is adopted when the speed variation ΔDTHR takes a negative value.

(5) Opening of Throttle Valve

While the actual opening DTH, i.e., a quantity indicative of the relation between the default opening THDEF of the throttle valve 16 and the opening TH showing the absolute position of the throttle valve 16 (DTH=TH−THDEF) has been used as an indication of the actual opening of the throttle valve 16, the opening TH may also be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving amount controller for controlling a driving amount of a controlled system by way of an output of a motor, comprising:
    a target driving amount input device adapted to input a target driving amount (DTHR) for said controlled system; and
    an ECU adapted to transmit to said motor a control signal for controlling the output of said motor with an output characteristic according to said target driving amount (DTHR),
    wherein said ECU performs either one or both of a process of increasing the output of said motor by increasing a duty ratio of said control signal according to an increase in a speed variation (ΔDTHR) of said target driving amount (DTHR) when said speed variation is positive (ΔDTHR) and a process of decreasing the output of said motor by increasing said duty ratio of said control signal according to a decrease in said speed variation (ΔDTHR) when an absolute value of said speed variation (ΔDTHR) is decreasing.

2. The driving amount controller as set forth in claim 1, wherein said controlled system is a throttle valve, and said driving amount is the opening of said throttle valve.

3. The driving amount controller as set forth in claim 1, wherein said ECU determines said output characteristic of said control signal by use of the positive quadratic function of said speed variation (ΔDTHR).

4. The driving amount controller as set forth in claim 2, wherein said ECU determines said output characteristic of said control signal by use of the positive quadratic function of said speed variation (ΔDTHR).

5. The driving amount controller as set forth in claim 1, wherein said target driving amount input device is a rotatable throttle grip connected to the ECU via a potentiometer.

6. The driving amount controller as set forth in claim 2, wherein said target driving amount input device is a rotatable throttle grip connected to the ECU via a potentiometer.

7. The driving amount controller as set forth in claim 3, wherein said target driving amount input device is a rotatable throttle grip connected to the ECU via a potentiometer.

8. A driving amount controller for controlling a driving amount of a controlled system by way of an output of a motor, comprising:
a target driving amount input device adapted to input a target driving amount (DTHR) for said controlled system; and
an ECU adapted to transmit to said motor a control signal for controlling the output of said motor with an output characteristic according to said target driving amount (DTHR),
wherein said ECU performs either one or both of a process of increasing the output of said motor by increasing a duty ratio of said control signal according to an increase in a speed variation (ADTHR) of said target driving amount (DTFR) when said speed variation (ADTHR) is positive and a process of decreasing the output of said motor by increasing said duty ratio of said control signal according to a decrease in said speed variation (ADTHR) when an absolute value of said speed variation (ADTHR) is decreasing,
wherein the controlled system includes a sensor, and the controlled system is adapted to receive an opening information signal of the sensor of the controlled system.

9. The driving amount controller as set forth in claim 8, wherein said controlled system is a throttle valve, and said driving amount is the opening of said throttle valve.

10. The driving amount controller as set forth in claim 8, wherein said ECU determines said output characteristic of said control signal by use of a positive quadratic function of said speed variation (ΔDTHR).

11. The driving amount controller as set forth in claim 9, wherein said ECU determines said output characteristic of said control signal by use of a positive quadratic function of said speed variation (ΔDTHR).

12. The driving amount controller as set forth in claim 8, wherein said target driving amount input device is a rotatable throttle grip connected to the ECU via a potentiometer.

13. The driving amount controller as set forth in claim 9, wherein said target driving amount input device is a rotatable throttle grip connected to the ECU via a potentiometer.

14. The driving amount controller as set forth in claim 10, wherein said target driving amount input device is a rotatable throttle grip connected to the ECU via a potentiometer.

* * * * *